(12) United States Patent
Yuan et al.

(10) Patent No.: US 12,537,705 B2
(45) Date of Patent: Jan. 27, 2026

(54) VIDEO CONFERENCE SYSTEM AND CONFERENCE FRAME DISPLAY METHOD

(71) Applicant: Chicony Electronics Co., Ltd., New Taipei (TW)

(72) Inventors: Shang-Yuan Yuan, New Taipei (TW); Hung-Bin Huang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 205 days.

(21) Appl. No.: 18/518,422

(22) Filed: Nov. 22, 2023

(65) Prior Publication Data

US 2024/0323041 A1 Sep. 26, 2024

(30) Foreign Application Priority Data

Mar. 23, 2023 (TW) .................................. 112111005

(51) Int. Cl.
| | | |
|---|---|---|
| *H04L 12/18* | (2006.01) | |
| *G06F 3/16* | (2006.01) | |
| *G06T 3/16* | (2024.01) | |
| *G06T 11/00* | (2006.01) | |
| *G06V 20/20* | (2022.01) | |
| *G06V 20/40* | (2022.01) | |

(52) U.S. Cl.
CPC .......... *H04L 12/1822* (2013.01); *G06F 3/167* (2013.01); *G06T 3/16* (2024.01); *G06T 11/00* (2013.01); *G06V 20/20* (2022.01); *G06V 20/49* (2022.01); *G06T 2200/24* (2013.01); *G06T 2210/12* (2013.01)

(58) Field of Classification Search
CPC ....... H04L 12/1822; G06T 3/16; G06T 11/00; G06T 7/73; G06T 2200/24; G06T 2210/12; G06T 2207/10016; G06T 2207/30201; G06F 3/167; G06V 20/20; G06V 20/49; G06V 40/20; G06V 40/161; G06V 40/16; G06V 10/22; H04N 7/15; H04N 7/152; H04N 5/2628; H04N 23/611; H04N 23/63; H04N 23/698; H04R 29/005; G01S 3/802; G10L 25/78
See application file for complete search history.

(56) References Cited

U.S. PATENT DOCUMENTS

2019/0222798 A1* 7/2019 Honma .................... G10L 19/00
2020/0358982 A1* 11/2020 Tsui ...................... H04R 29/005
2022/0415003 A1* 12/2022 Chen ...................... H04N 7/147

FOREIGN PATENT DOCUMENTS

| CN | 115426474 A | * 12/2022 | ............. G10L 25/78 |
| TW | 202209860 A | 3/2022 | |
| TW | 202304196 A | 1/2023 | |

* cited by examiner

*Primary Examiner* — Yogeshkumar Patel
(74) *Attorney, Agent, or Firm* — CKC & Partners Co., LLC

(57) ABSTRACT

The present disclosure provides video conference system and conference frame display method. The conference frame display method includes: detecting a direction of at least one voice signal according to at least one audio signal; performing an image recognition on at least one of a plurality of image areas in a rectangle image according to the direction of the at least one voice signal; and in a condition that at least one object of interest is recognized from the at least one of the plurality of image areas, by a display device, displaying an emphasized frame visually highlighting the at least one object of interest.

16 Claims, 14 Drawing Sheets

VIDEO CONFERENCE SYSTEM AND CONFERENCE FRAME DISPLAY METHOD

CROSS-REFERENCE TO RELATED APPLICATION

This application claims priority to Taiwan Application Serial Number 112111005, filed Mar. 23, 2023, which is herein incorporated by reference in its entirety.

BACKGROUND

Field of Invention

This disclosure relates to a system and method, and in particular to a video conference system and conference frame display method.

Description of Related Art

The conventional auto framing system cooperates with the face recognition to perform process, such as partial amplification, shifting, on the image, so as to focus on the target object (e.g., conference speaker) on the image. However, when being applied to the panoramic image, the conventional auto framing system might not correctly focus on the area where the target object is because there are too many faces in the panoramic image. Therefore, it is necessary to improve these.

SUMMARY

An aspect of present disclosure relates to a video conference system. The video conference system includes a control device. The control device is configured to: detect a direction of at least one voice signal according to at least one audio signal; perform an image recognition on at least one of a plurality of image areas in a rectangle image according to the direction of the at least one voice signal; and in a condition that at least one object of interest is recognized from the at least one of the plurality of image areas, control a display device to display an emphasized frame visually highlighting the at least one object of interest.

Another aspect of present disclosure relates to a conference frame display method. The conference frame display method includes: detecting a direction of at least one voice signal according to at least one audio signal; performing an image recognition on at least one of a plurality of image areas in a rectangle image according to the direction of the at least one voice signal; and in a condition that at least one object of interest is recognized from the at least one of the plurality of image areas, by a display device, displaying an emphasized frame visually highlighting the at least one object of interest.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure. In all the drawings, the same reference numbers are used to indicate the same or similar elements.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
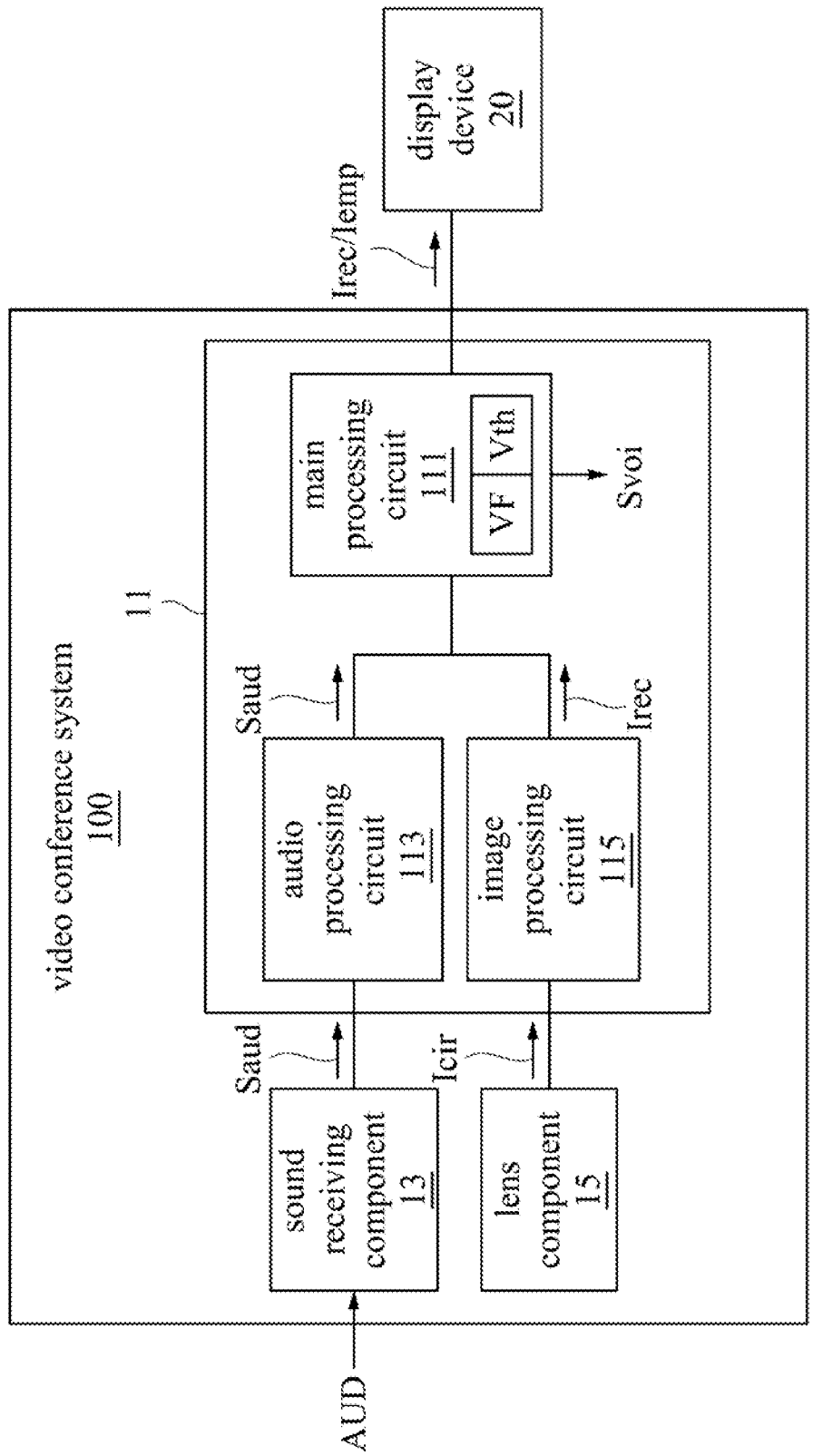
FIG. 1 is a block diagram of a video conference system in accordance with some embodiments of the present disclosure.

Referring to FIG. 1, FIG. 1 is a block diagram of a video conference system 100 in accordance with some embodiments of the present disclosure. In some embodiments, the video conference system 100 includes a control device 11, a sound receiving component 13 and a lens component 15.

In some embodiments, the video conference system 100 can be arranged in open or closed space (not shown), such as a conference room, and can track person who is speaking in the space. In addition, as shown in FIG. 1, the video conference system 100 can be electrically or communicatively coupled to a display device 20 also arranged in the space, to display frames related to the person speaking in the space to user of the video conference system 100 via the display device 20.

Figure 2:
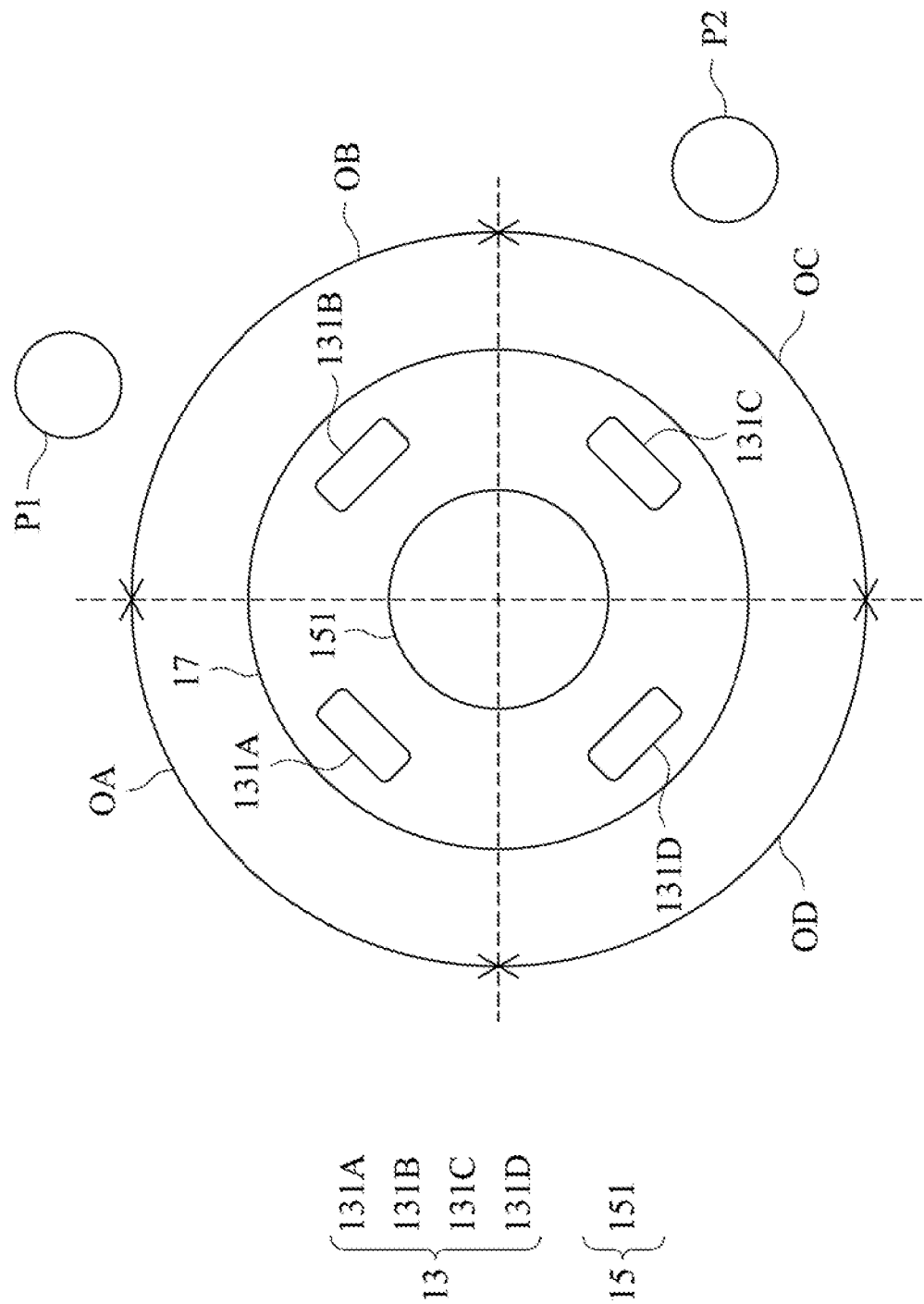
FIG. 2 is a schematic diagram of a sound receiving component and a lens component in accordance with some embodiments of the present disclosure.

Referring to FIG. 2, FIG. 2 is a schematic diagram of the sound receiving component 13 and the lens component 15 in accordance with some embodiments of the present disclosure. In some embodiments, the lens component 15 includes a fisheye lens 151. As shown in FIG. 2, the fisheye lens 151 can be arranged on a shell 17, for example on a top portion of the shell 17. In such way, when the shell 17 is placed on a plane of an object (e.g., a table in the conference room) in the space, the lens component 15 can use the fisheye lens 151 to capture and generate signals correspondingly.

It should be understood that the lens component 15 is not limited to configuration as shown in FIG. 2. For example, in some embodiments, the lens component 15 further includes at least one light sensitive element (e.g., complementary metal oxide semiconductor (CMOS) image sensor, charge coupled device (CCD) image sensor, etc.), and the light sensitive element is configured to convert light signals captured by the fisheye lens 151 into electric signals. In addition, the lens component 15 is not limited to being implemented by the fisheye lens 151.

In some embodiments, as shown in FIG. 2, the sound receiving component 13 includes four unidirectional microphones 131A-131D. The unidirectional microphones 131A-131D each can receive sounds in a predetermined range (e.g., cardiod range, hypercardiod range, shotgun range, etc.) in front of itself. In order to receive sounds from all directions, the unidirectional microphones 131A-131D can be arranged on the shell 17 at equal angular intervals with the fisheye lens 151 or an axial line of the shell 17 as a center. Accordingly, when the shell 17 is placed on the plane of the object in the space, the sound receiving component 13 can use the unidirectional microphones 131A-131D to receive sounds and generate signals correspondingly.

It should be understood that the unidirectional microphones 131A-131D are not limited to configuration as shown in FIG. 2. For example, the amount of the unidirectional microphones 131A-131D can be increased/decreased as the predetermined range is narrowed/expanded. In addition, the sound receiving component 13 is also not limited to being implemented by the unidirectional microphones 131A-131D. For example, in some embodiments, the sound receiving component 13 can be implemented by multiple bi-directional microphones or single omnidirectional microphone.

In some embodiments, as shown in FIG. 1, the control device 11 includes a main processing circuit 111, an audio processing circuit 113 and an image processing circuit 115. The main processing circuit 111 is coupled to the audio processing circuit 113, to control the audio processing circuit 113 to receive signals from the sound receiving component 13 wirelessly or wiredly. The main processing circuit 111 is also coupled to the image processing circuit 115, to control the image processing circuit 115 to receive signals from the lens component 15 wirelessly or wiredly. Accordingly, the control device 11 can execute related operations according to the received signals. For example, the related operations can be that the main processing circuit 111 in the control device 11 wirelessly or wiredly controls the display device 20 to display the frames related to the person speaking in the space, which would be described in detail below with reference to FIG. 3.

In the embodiments of FIG. 1, the main processing circuit 111, the audio processing circuit 113 and the image processing circuit 115 each can be implemented by central processing unit (CPU), application specific integrated circuit (ASIC), microprocessor, System on a Chip (SoC) or other elements with similar functions. The control device 11 can be implemented by physical server or cloud hosting. In addition, the display device 20 can be implemented by various displays or even a combination of projector and projection screen. It can be seen that the display device 20 is independent from the control device 11, but the present disclosure is not limited herein. For example, in some embodiments, the display device 20 and the control device 11 can also be integrated into single computation device (e.g., laptop, tablet, etc.).

Figure 3:
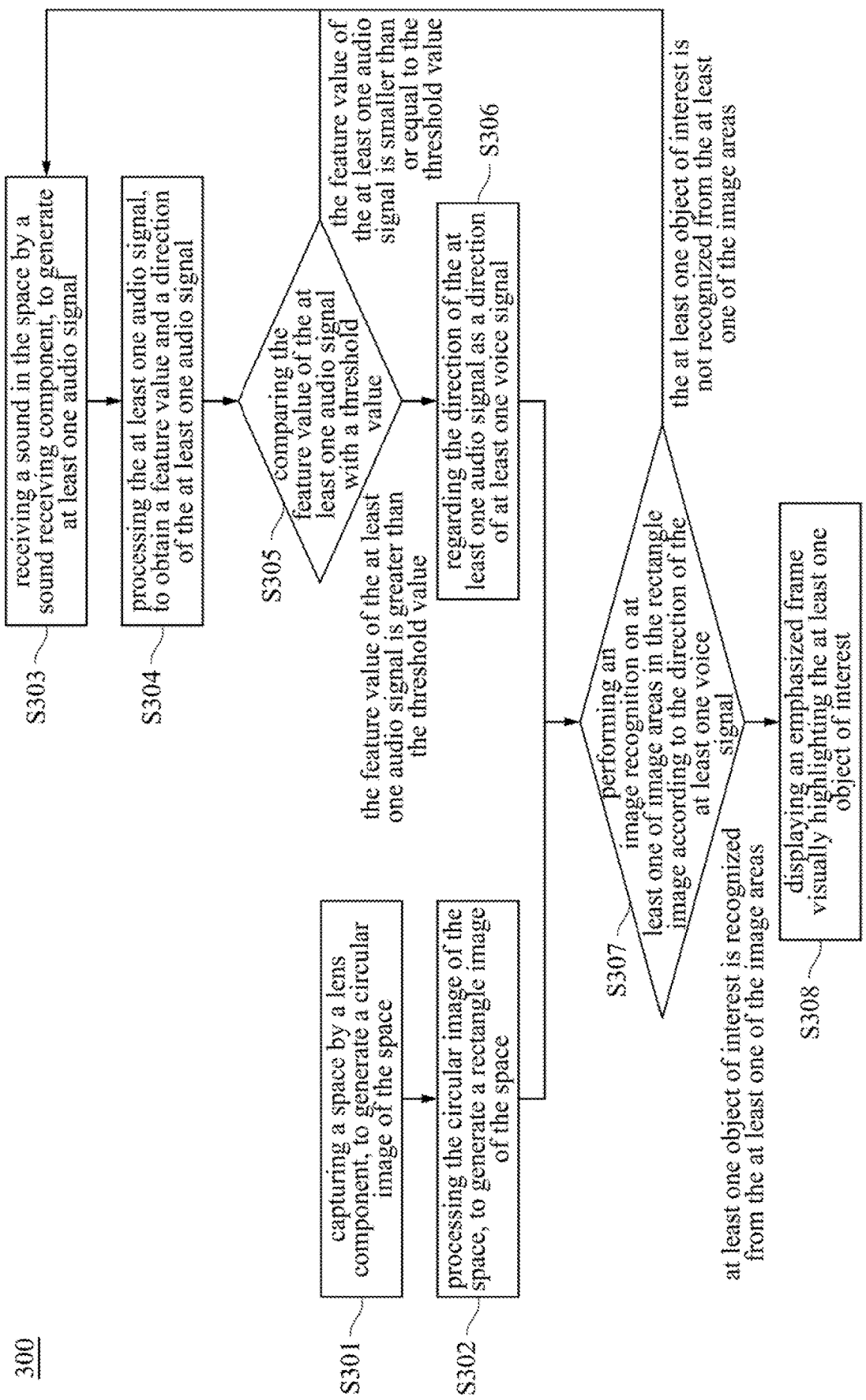
FIG. 3 is a flow diagram of a conference frame display method in accordance with some embodiments of the present disclosure.

The operation of the video conference system 100 would be described in detail below with reference to FIG. 3. Referring to FIG. 3, FIG. 3 is a flow diagram of a conference frame display method 300 in accordance with some embodiments of the present disclosure. In some embodiments, as shown in FIG. 3, the conference frame display method 300 includes steps S301-S308. It should be understood that the conference frame display method 300 of the present disclosure is not limited to being applied to the video conference system 100 of FIG. 1, and is not limited to being in the order of steps in the flow diagram of FIG. 3. For example, steps S301-S302 can be executed after steps S303-S306.

Figure 4:
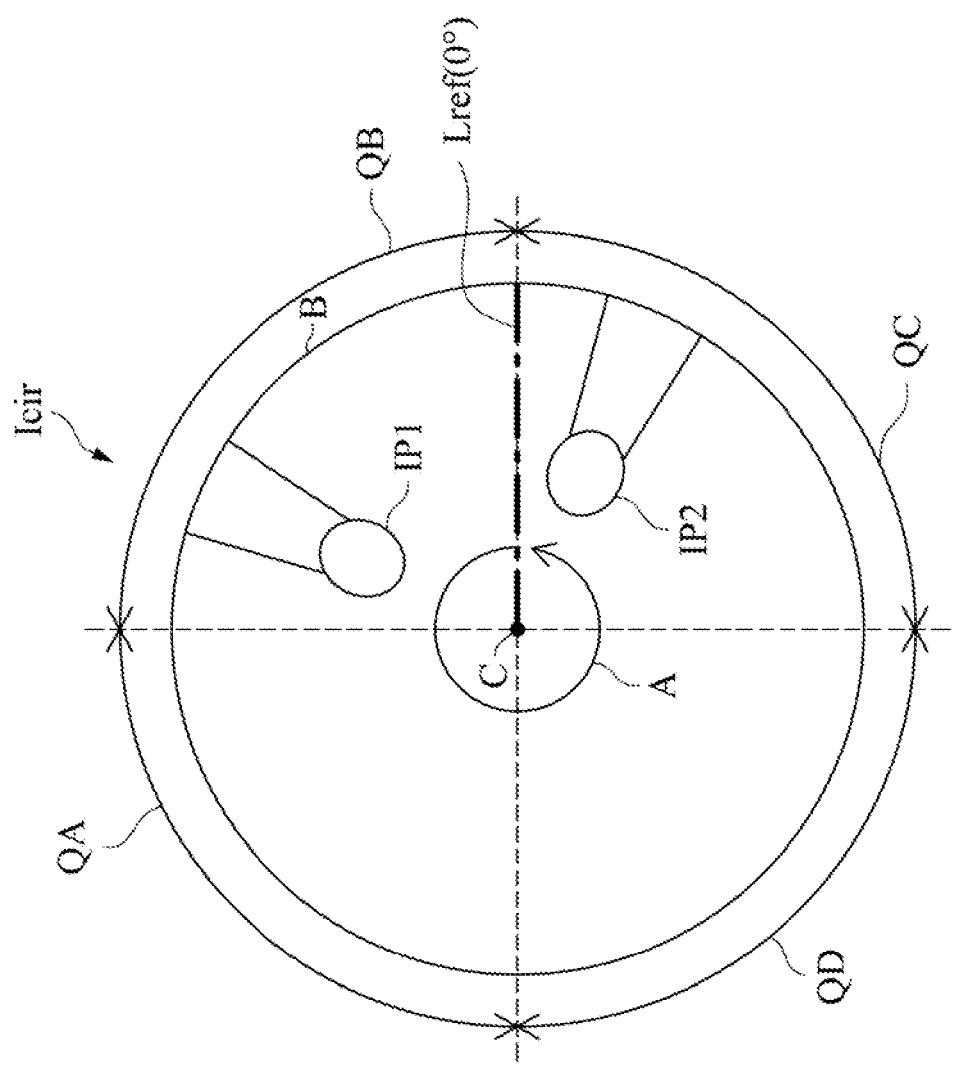
FIG. 4 is a schematic diagram of a circular image in accordance with some embodiments of the present disclosure.

In step S301, as shown in FIG. 1, the video conference system 100 captures the space by the lens component 15, to generate at least one circular image Icir of the space. In some embodiments, as shown in FIG. 2, there are two persons P1 and P2 in the space where the lens component 15 is, and the lens component 15 use the fisheye lens 151 to capture the space to generate the circular image Icir. Accordingly, the circular image Icir generated by the lens component 15 might include a frame as shown in FIG. 4, in which FIG. 4 is a schematic diagram of the circular image Icir in accordance with some embodiments of the present disclosure. In particular, as shown in FIG. 4, the circular image Icir would include at least a person image IP1 of the person P1 and a person image IP2 of the person P2.

Figure 5:
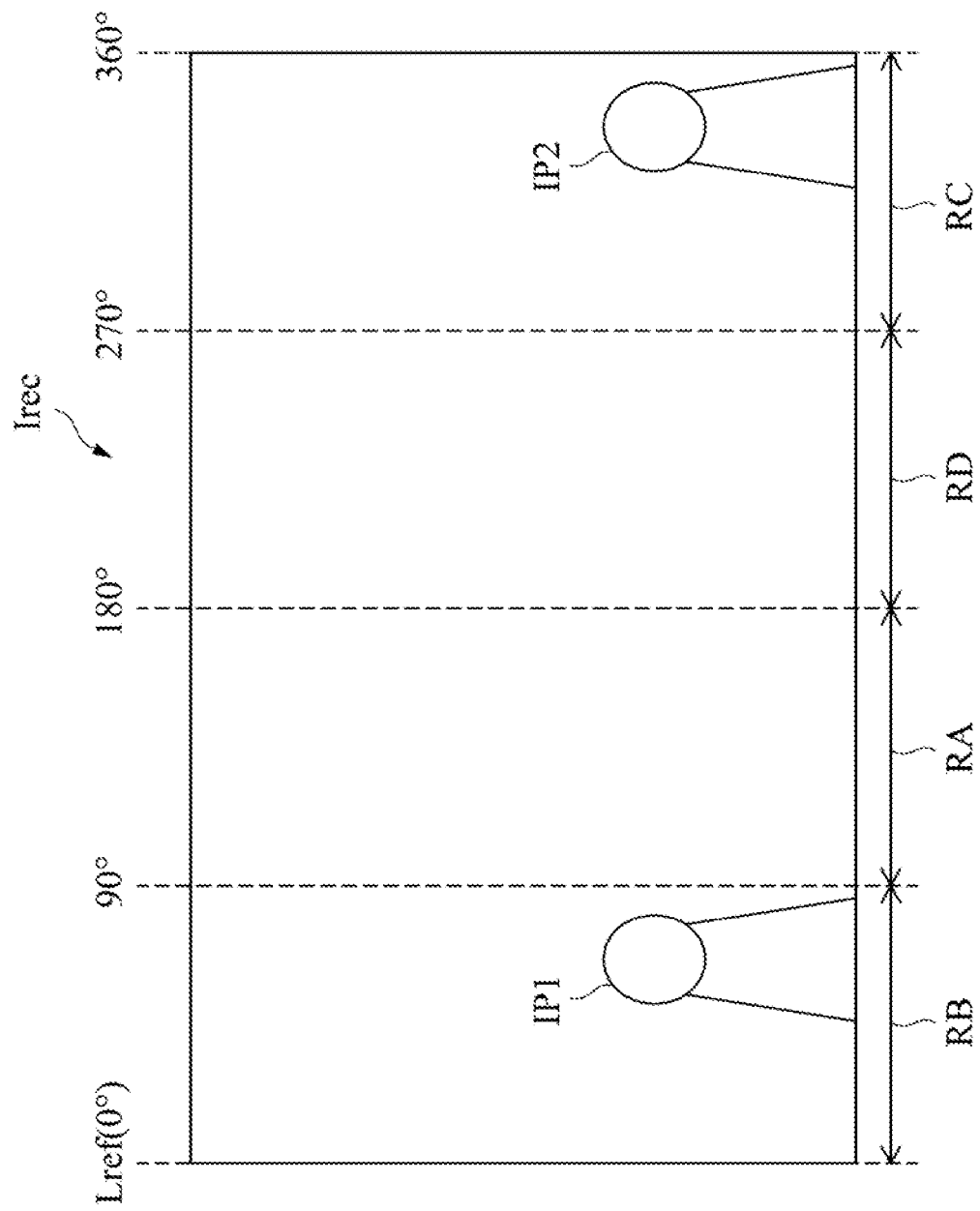
FIG. 5 is a schematic diagram of a rectangle image in accordance with some embodiments of the present disclosure.

In step S302, as shown in FIG. 1, the control device 11 of the video conference system 100 processes the circular image Icir of the space, to generate a rectangle image Irec of the space. The generation of the rectangle image Irec would be described in detail then with reference to FIGS. 4 and 5, in which FIG. 5 is a schematic diagram of the rectangle image Irec in accordance with some embodiments of the present disclosure. In some embodiments, as shown in FIG. 4, the image processing circuit 115 of the control device 11 defines a reference line Lref (which is presented by one-dot chain line in FIG. 4) on the circular image Icir as an angle reference (i.e., 0 degree) on the circular image Icir. Then, at a 0-degree position on the circular image Icir, the image processing circuit 115 scans pixels between a circle center C and a circumference B as a $1^{st}$ column of pixels in the rectangle image Irec. By analogy, the image processing circuit 115 sequentially scans pixels at different angle positions on the circular image Icir along a counterclockwise direction A, to obtain other columns of pixels in the rectangle image Irec, so as to generate the rectangle image Irec. The counterclockwise direction A in FIG. 4 is shown for the purpose of illustration, but the present disclosure is not limited herein. For example, the image processing circuit 115 can also sequentially scan the circular image Icir along a clockwise direction, to generate the rectangle image Irec.

In step S303, as shown in FIG. 1, the video conference system 100 receives a sound AUD in the space by the sound receiving component 13, to generate at least one audio signal Saud. In accordance with the embodiments of FIG. 2, the sound AUD received by the sound receiving component 13 might include voice of the person P1, voice of the person P2 and/or ambient sound in the space. In addition, the sound receiving component 13 can use the unidirectional microphones 131A-131D to convert the sound AUD into the at least one audio signal Saud.

In step S304, as shown in FIG. 1, the control device 11 of the video conference system 100 processes the at least one audio signal Saud, to obtain a feature value VF and a direction of the at least one audio signal Saud.

In the embodiments that the sound receiving component 13 is implemented by the unidirectional microphones 131A-131D as shown in FIG. 2, the audio processing circuit 113 of the control device 11 is configured to perform noise reduction and/or human voice enhancement on the audio signal Saud, and is configured to output the processed audio signal Saud to the main processing circuit 111. As shown in FIG. 1, the main processing circuit 111 calculates a sound pressure level of the processed audio signal Saud as the feature value VF of the audio signal Saud. In addition, the main processing circuit 111 is further configured to recognize the direction of the at least one audio signal Saud by sources of the at least one audio signal Saud (i.e., at least one of the unidirectional microphones 131A-131D). As shown in FIG. 2, the unidirectional microphones 131A-131D are corresponding to multiple directions OA-OD, respectively. For example, it is assumed that current speaker is the person P2, the unidirectional microphone 131C would convert the voice of the person P2 into the audio signal Saud for outputting. Accordingly, the main processing circuit 111 would regard the direction OC corresponding to the unidirectional microphone 131C as the direction of the audio signal Saud. The condition with more than one speaker can be deduced by analogy, and therefore the descriptions thereof are omitted herein.

Step S304 would be further described herein. In the embodiments that the sound receiving component 13 is implemented by the single omnidirectional microphone, the audio processing circuit 113 is configured to perform the noise reduction and/or the human voice enhancement on the audio signal Saud. In addition, because the range that the omnidirectional microphone capable of receiving sound is 360 degrees, the main processing circuit 111 cannot directly recognize the direction of the at least one audio signal Saud. Accordingly, the audio processing circuit 113 is further configured to calculate the direction of the at least one audio signal Saud by direction of arrival algorithm. In this example, the calculation of the feature value VF of the audio signal Saud is similar to the above descriptions, and therefore the descriptions thereof are omitted herein.

In step S305, the control device 11 of the video conference system 100 compares the feature value VF of the at least one audio signal Saud with a threshold value Vth. In some embodiments, the threshold value Vth can be preset and stored in a storage circuit (not shown) of the control device 11. For example, the video conference system 100 can receive the ambient sound in the space via the sound receiving component 13 and generate ambient audio signals (not shown) correspondingly when there is no one in the space, so as to calculate a sound pressure level of the ambient audio signals as the threshold value Vth. Accordingly, in the subsequent operations, the main processing circuit 111 can access the threshold value Vth from the storage circuit for comparison with the feature value VF of the audio signal Saud. In accordance with the above example that the current speaker is the person P2, the main processing circuit 111 would determine that the feature value VF of the audio signal Saud outputted by the unidirectional microphone 131C as shown in FIG. 2 is greater than the threshold value Vth, so that step S306 is executed.

Furthermore, in the condition that there is no person speaking in the space, the main processing circuit 111 would determine that the feature value VF of the at least one audio signal Saud outputted by the unidirectional microphones 131A-131D is smaller than or equal to the threshold value Vth, so that step S303 is executed again.

In step S306, the control device 11 of the video conference system 100 regards the direction of the at least one audio signal Saud as a direction of at least one voice signal Svoi. In the condition that the feature value VF of the audio signal Saud is greater than the threshold value Vth, the sound AUD corresponding to the audio signal Saud is likely to include the voice of the person (e.g., the person P1, the person P2, etc.). Accordingly, the audio signal Saud can be regarded as the voice signal Svoi, and the main processing circuit 111 can use the direction of the audio signal Saud obtained in step S304 as the direction of the voice signal Svoi.

As can be seen from the descriptions of steps S304-S306, the control device 11 of the video conference system 100 detects the direction of the at least one voice signal Svoi according to the at least one audio signal Saud.

In step S307, the control device 11 of the video conference system 100 performs an image recognition on at least one of image areas RA-RD in the rectangle image Irec according to the direction of the at least one voice signal Svoi. Before further describing step S307, the image areas RA-RD of the rectangle image Irec would be described first. As can be seen from the descriptions of FIGS. 4 and 5, the image areas RA-RD of the rectangle image Irec are equivalent to being formed from extension of image areas QA-QD of the circular image Icir. Moreover, the image areas QA-QD of the circular image Icir are divided according to the directions OA-OD corresponding to the unidirectional microphones 131A-131D in FIG. 2. Accordingly, the main processing circuit 111 can find a corresponding one of the image areas QA-QD according to the direction of the voice signal Svoi, and can further find a corresponding one of the image areas RA-RD.

In accordance with the above example that the current speaker is the person P2, the main processing circuit 111 finds the corresponding image area RC from the rectangle image Irec according to the direction of the voice signal Svoi (that is, the direction OC corresponding to the unidirectional microphone 131C in FIG. 2). Then, the main processing circuit 111 performs the image recognition (e.g., face recognition) on the image area RC, to recognize the person image IP2 from the image area RC, in which the person image IP2 corresponding to the current speaker can be regarded as object of interest. In this condition, step S308 is executed.

Furthermore, in the condition that the main processing circuit 111 does not recognize at least one object of interest from the image area corresponding to the direction of the voice signal Svoi (that is, the at least one of the image areas RA-RD), step S303 is executed again.

Figure 6:
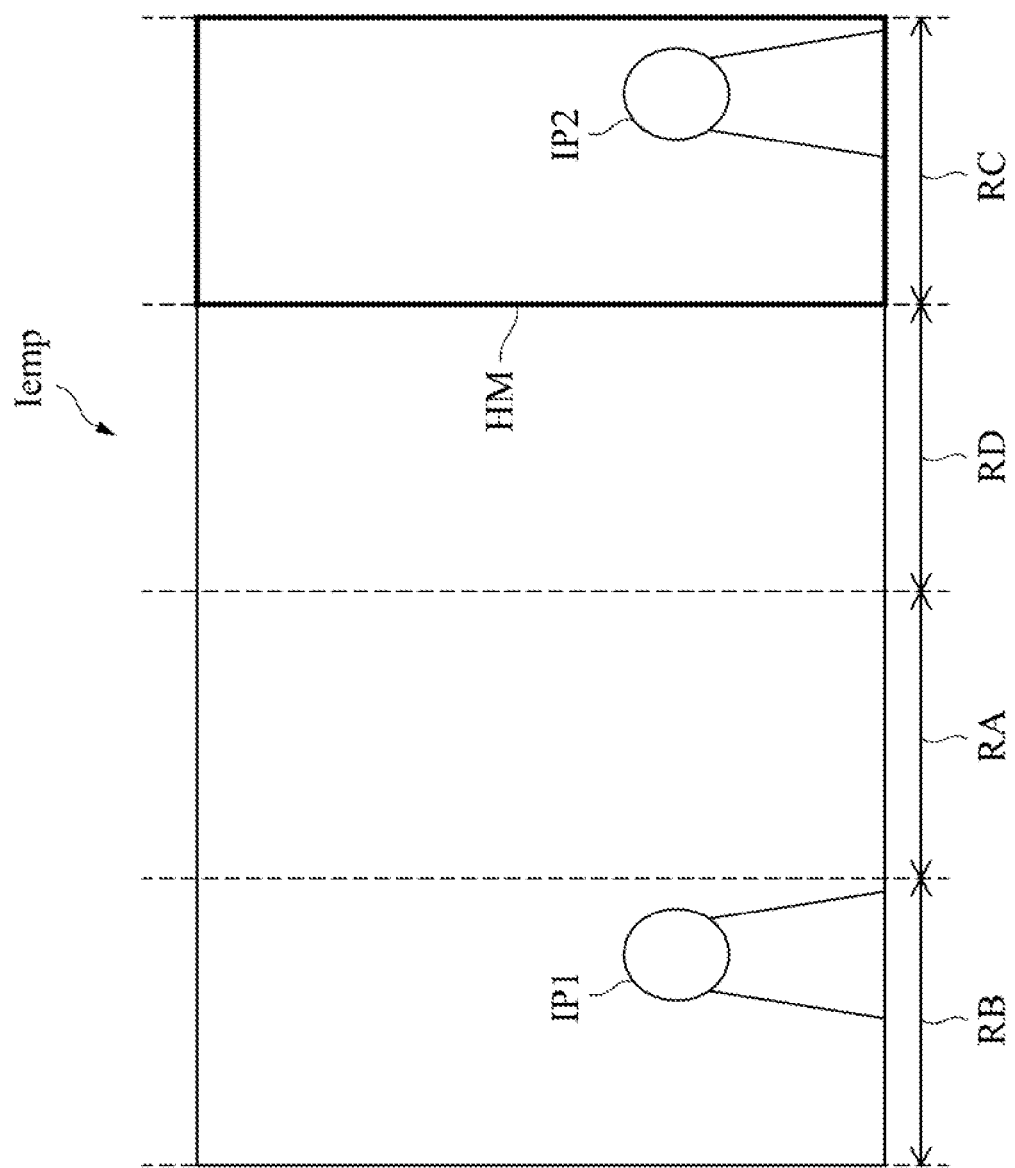
FIG. 6 is a schematic diagram of an emphasized frame in accordance with some embodiments of the present disclosure.

In step S308, as shown in FIG. 1, the control device 11 of the video conference system 100 controls the display device 20 to display an emphasized frame Iemp visually highlighting the at least one object of interest. Referring to FIG. 6, FIG. 6 is a schematic diagram of the emphasized frame Iemp in accordance with some embodiments of the present disclosure. In some embodiments, the control device 11 is configured to process the rectangle image Irec to generate the emphasized frame Iemp. In accordance with the above example that the current speaker is the person P2, as shown in FIGS. 5 and 6, the control device 11 can cover the image area RC (the position where the person image IP2 is) with a highlight object HM, to generate the emphasized frame Iemp (i.e., the frames related to the person speaking in the space). Then, the control device 11 outputs the emphasized frame Iemp to the display device 20, and controls the display device 20 to display the emphasized frame Iemp.

In the embodiments of FIG. 6, the highlight object HM covers the image area RC where the object of interest (i.e., the person image IP2) is, which is equivalent to visually highlighting the object of interest by highlighting the image area RC where the object of interest is. However, the highlight object HM is not limited to that as shown in FIG. 6. For example, in some embodiments, the highlight object HM can directly cover the object of interest, which would be further described below with reference to FIGS. 7 and 8.

Figure 7:
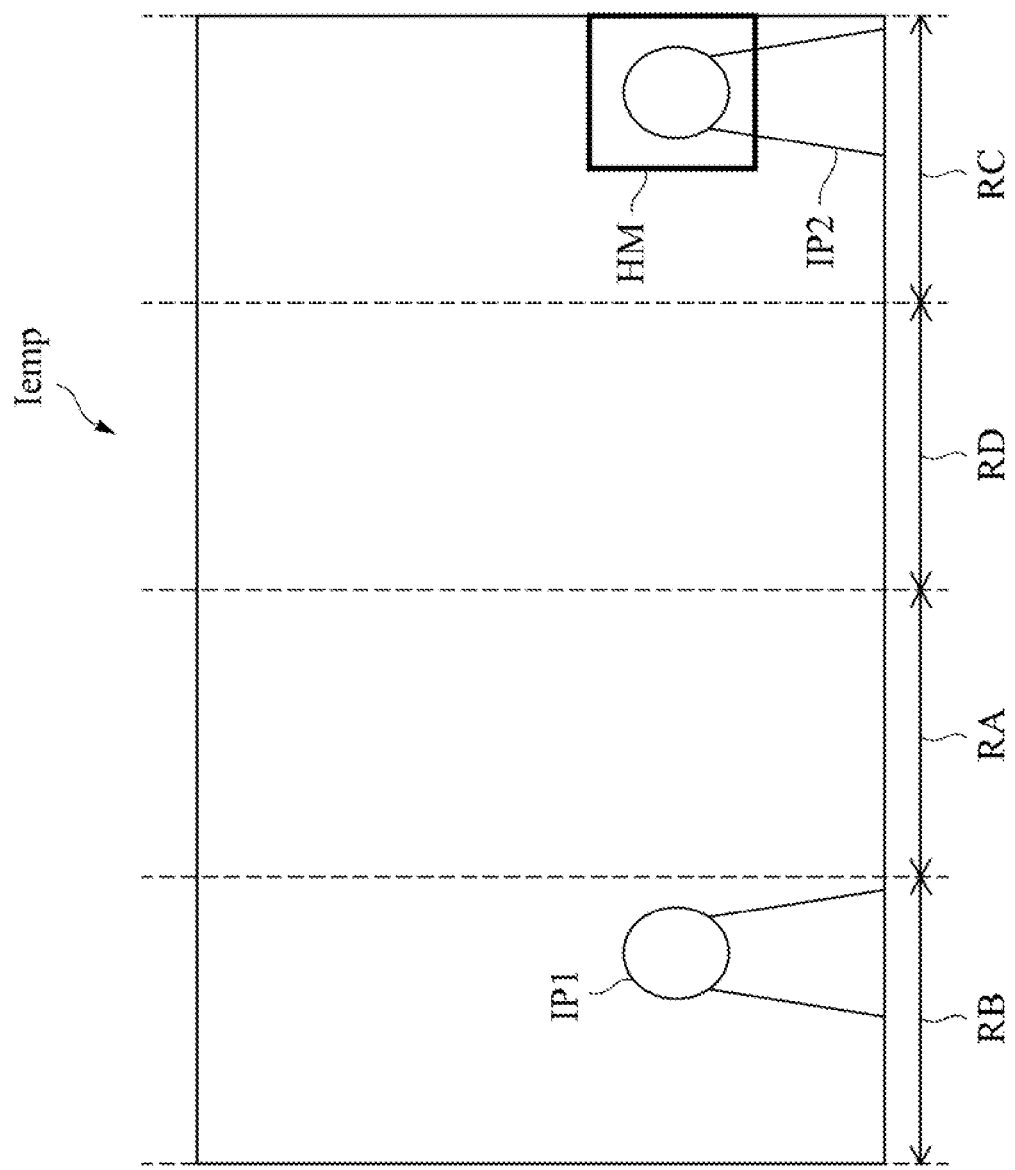
FIG. 7 is a schematic diagram of an emphasized frame in accordance with some embodiments of the present disclosure.

Referring to FIG. 7, FIG. 7 is a schematic diagram of the emphasized frame Iemp in accordance with some embodiments of the present disclosure. In some embodiments, as shown in FIG. 7, the control device 11 covers a facial image of the person image IP2 in the image area RC with the highlight object HM, to generate the emphasized frame Iemp.

Figure 8:
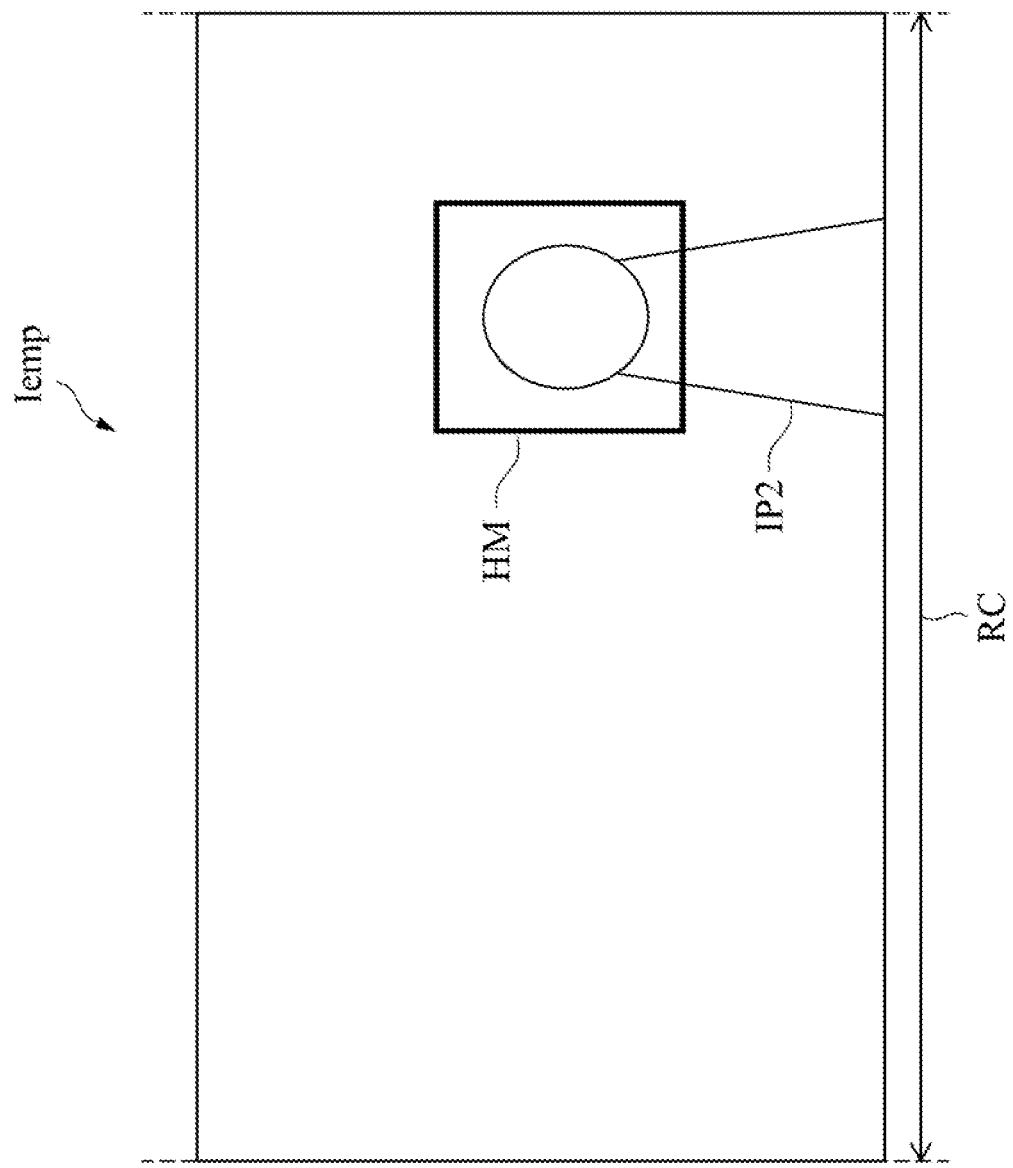
FIG. 8 is a schematic diagram of an emphasized frame in accordance with some embodiments of the present disclosure.

Referring to FIG. 8, FIG. 8 is a schematic diagram of the emphasized frame Iemp in accordance with some embodiments of the present disclosure. In some embodiments, as shown in FIG. 8, the control device 11 first divides the image area RC from the rectangle image Irec, then covers the facial image of the person image IP2 in the image area RC with the highlight object HM, to generate the emphasized frame Iemp.

The embodiments of FIGS. 6-8 are illustrated on the premise that there is only one speaker, the person P2, in the space, but the emphasized frame Iemp of the present disclosure is not limited herein. For example, in some embodiments, both the person P1 and the person P2 in FIG. 2 are speaking. In such condition, the control device 11 can generate the emphasized frame Iemp with the highlight object(s) HM which is(are) capable of covering both the person image IP1 and the person image IP2.

It should be understood that the conference frame display method 300 of the present disclosure can increase related steps according to real requirements, which would be further described below with reference to FIGS. 9 and 10.

Figure 9:
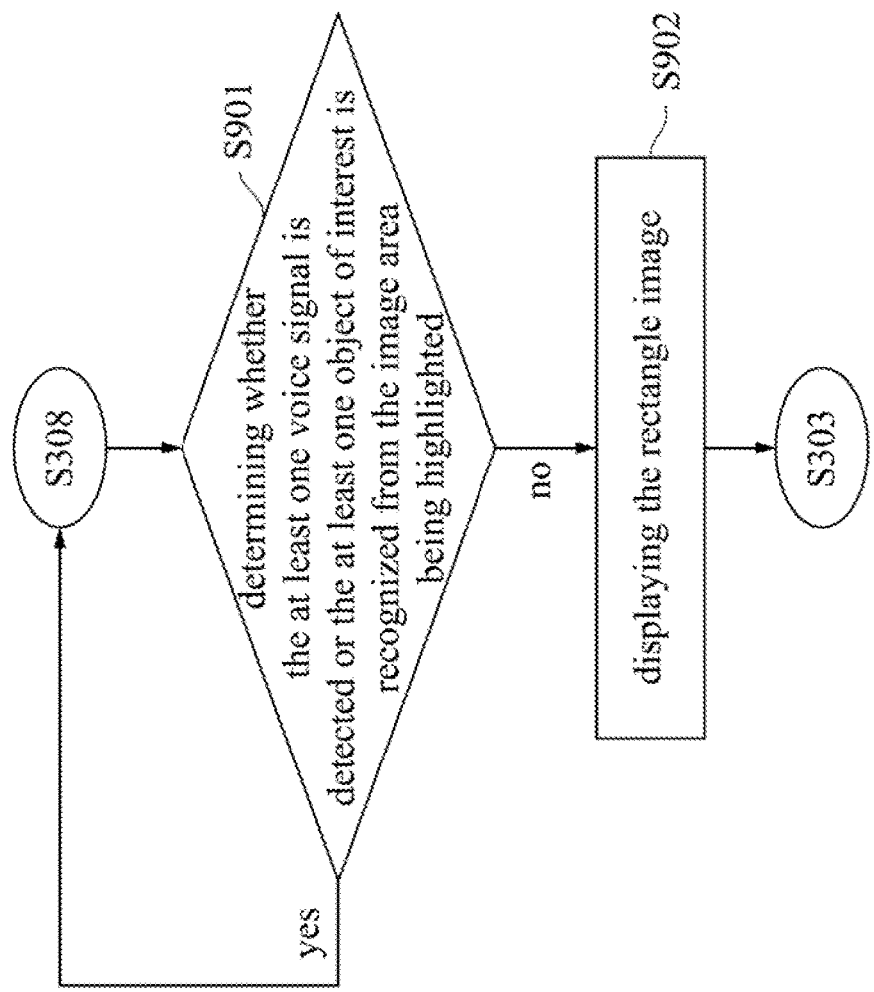
FIG. 9 is a flow diagram of a conference frame display method in accordance with some embodiments of the present disclosure.

Referring to FIG. 9, FIG. 9 is a flow diagram of the conference frame display method 300 in accordance with some embodiments of the present disclosure. In some embodiments, as shown in FIG. 9, the conference frame display method 300 further includes steps S901-S902. Steps S901-S902 can be executed after step S308.

In step S901, the control device 11 of the video conference system 100 determines whether the at least one voice signal Svoi is detected or the at least one object of interest is recognized from the image area being highlighted. In the embodiments of FIG. 9, the image area being highlighted can be, for example, the image area RC covered with or having the highlight object HM in FIGS. 6, 7 and 8.

In accordance with the embodiments of FIGS. 6, 7 and 8, after highlighting the image area RC by the highlight object HM, the control device 11 can determine whether the voice signal Svoi is detected from the image area RC by detecting the voice signal Svoi corresponding to the direction OC. The descriptions of detecting the voice signal Svoi corresponding to the direction OC are similar to the descriptions of steps S303-S306, and therefore are omitted herein. In some embodiments, the control device 11 detects the voice signal Svoi corresponding to the direction OC and determines the voice signal Svoi is detected from the image area RC accordingly, which represents that the person P2 is still speaking. Accordingly, step S308 is executed again. In some embodiments, the control device 11 does not detect the voice signal Svoi corresponding to the direction OC and determines the voice signal Svoi is not detected from the image area RC accordingly, which represents that the person P2 stops speaking. Accordingly, step S902 is executed.

In accordance with the embodiments of FIGS. 6, 7 and 8 again, after highlighting the image area RC by the highlight object HM, the control device 11 can also determine whether the object of interest (i.e., the person image IP2) is recognized from the image area RC by performing the image recognition on the image area RC. In some embodiments, the control device 11 determines that the person image IP2 is recognized from the image area RC, which represents that the person P2 might be speaking at his/her original position. Accordingly, step S308 is executed again. In some embodiments, the control device 11 determines that the person image IP2 is not recognized from the image area RC, which represents that the person P2 leaves his/her original position. Accordingly, step S902 is executed.

In step S902, the control device 11 of the video conference system 100 controls the display device 20 to display the rectangle image Irec. In the condition that the person P2 stops speaking or the person P2 leaves his/her original position, as shown in FIG. 1, the control device 11 outputs the rectangle image Irec as shown in FIG. 5 to the display device 20 and controls the display device 20 to display the rectangle image Irec. Thereafter, step S303 is executed again, so as to detect the direction of the at least one voice signal Svoi in the subsequent operations.

Figure 10:
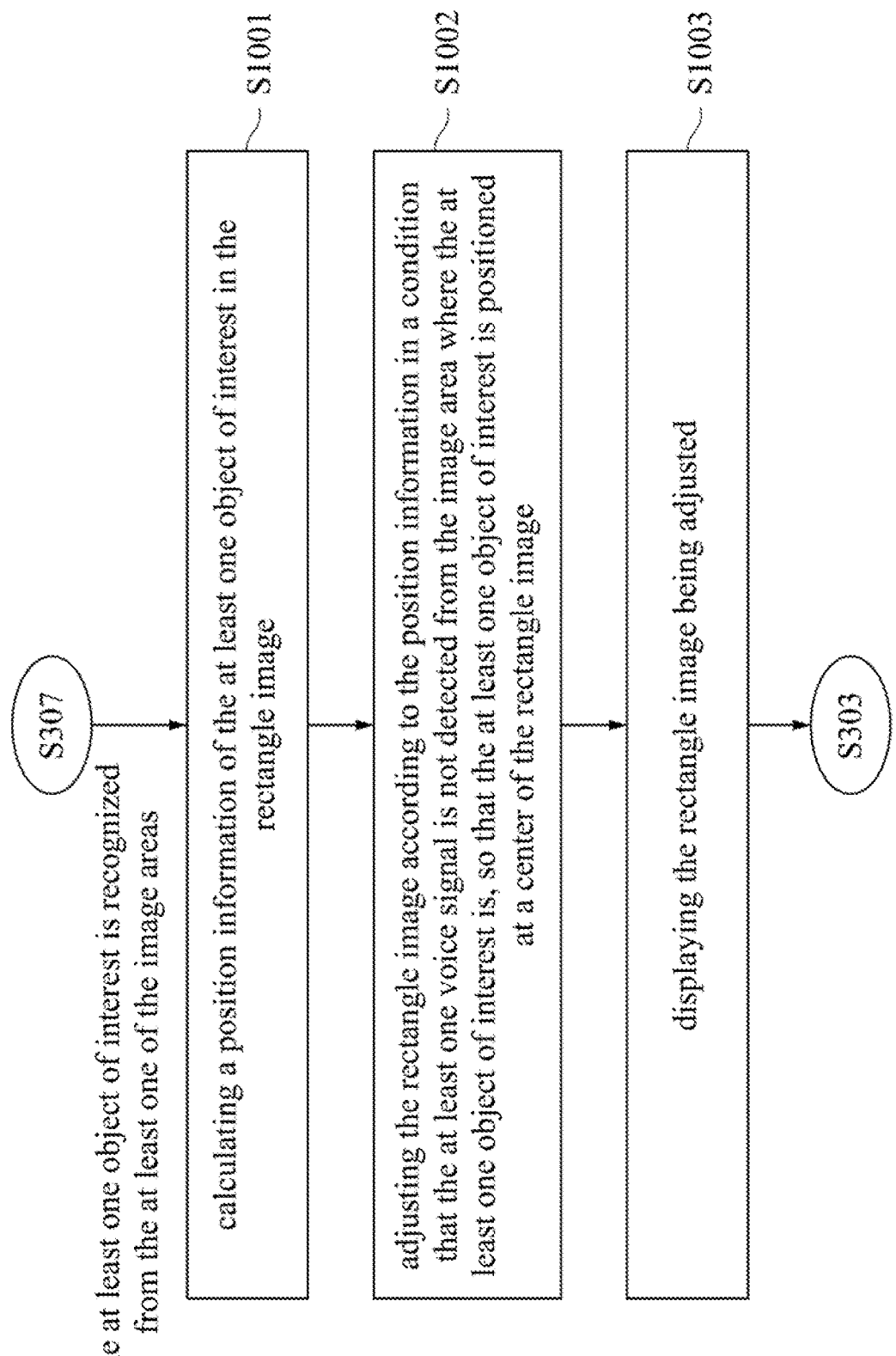
FIG. 10 is a flow diagram of a conference frame display method in accordance with some embodiments of the present disclosure.

Referring to FIG. 10, FIG. 10 is a flow diagram of the conference frame display method 300 in accordance with some embodiments of the present disclosure. In some embodiments, as shown in FIG. 10, the conference frame display method 300 further includes steps S1001-S1003. Steps S1001-S1003 can be executed after the control device 11 recognizes the at least one object of interest from the at least one of the image areas RA-RD in step S307. In addition, steps S1001-S1003 can be executed while step S308 of FIG. 3 is executed, or before or after step S308 of FIG. 3 is executed.

In step S1001, the control device 11 of the video conference system 100 calculates a position information of the at least one object of interest in the rectangle image Irec. In accordance with the embodiments of FIGS. 6, 7 and 8 again, after recognizing the person image IP2 (i.e., the object of interest) from the image area RC, the control device 11 calculates the position information of the person image IP2 in the rectangle image Irec, which would be described below with reference to FIG. 11.

Figure 11:
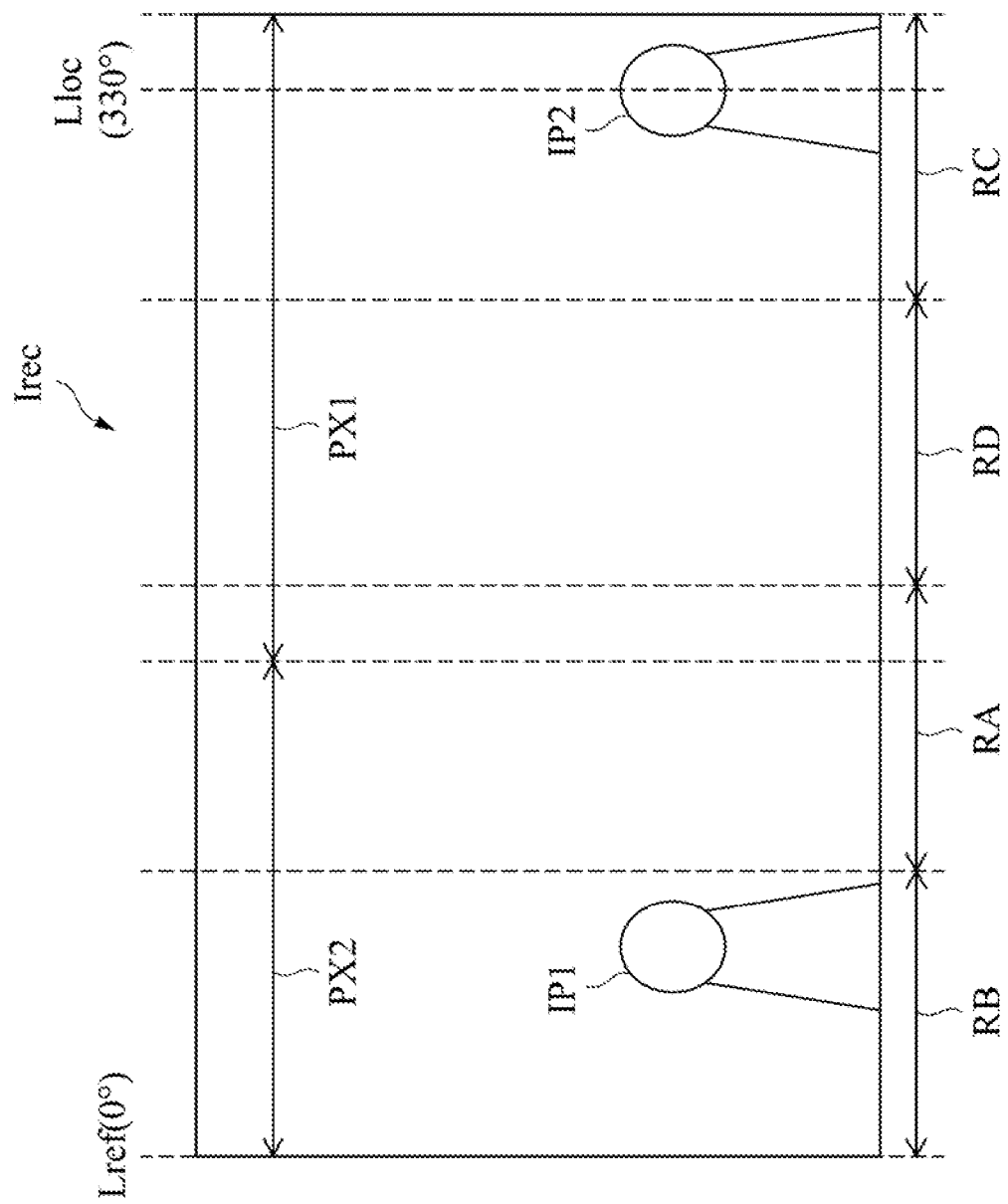
FIG. 11 is a schematic diagram of a position information of object of interest in the rectangle image in accordance with some embodiments of the present disclosure.

Referring to FIG. 11, FIG. 11 is a schematic diagram of the position information of the person image IP2 in the rectangle image Irec in accordance with some embodiments of the present disclosure. As shown in FIG. 11, the control device 11 can define a position line Lloc of the person image IP2 on the rectangle image Irec according to a center of the person image IP2. Since the rectangle image Irec is formed by extending the circular image Icir, the control device 11 then calculates the angle position corresponding to the position line Lloc as the position information according to the $1^{st}$ column of pixels in the rectangle image Irec corresponding to the reference line Lref on the circular image Icir.

In these embodiments, as shown in FIG. 11, the position line Lloc is corresponding to a 330-degree position.

In step S1002, in the condition that the at least one voice signal Svoi is not detected from the image area where the at least one object of interest is, the control device 11 of the video conference system 100 adjusts the rectangle image Irec according to the position information, so that the at least one object of interest is positioned at a center of the rectangle image Irec. In accordance with the embodiments of FIGS. 6, 7 and 8 again, after recognizing the person image IP2 from the image area RC, the control device 11 further detects whether there is the voice signal Svoi corresponding to the direction OC. The descriptions of detecting the voice signal Svoi corresponding to the direction OC are similar to the descriptions of steps S303-S306, and therefore are omitted herein.

In the condition that the voice signal Svoi corresponding to the direction OC is not detected (which represents that the person P2 stops speaking), the control device 11 calculates an angle difference between the position line Lloc (e.g., the 330-degree position) and a central line of the rectangle image Irec (which corresponds to a 180-degree position). In these embodiments, the angle difference is 150 degrees. Thereafter, the control device 11 uses the angle difference between the position line Lloc and the central line of the rectangle image Irec to adjust positions of each column of pixels in the rectangle image Irec.

Figure 12:
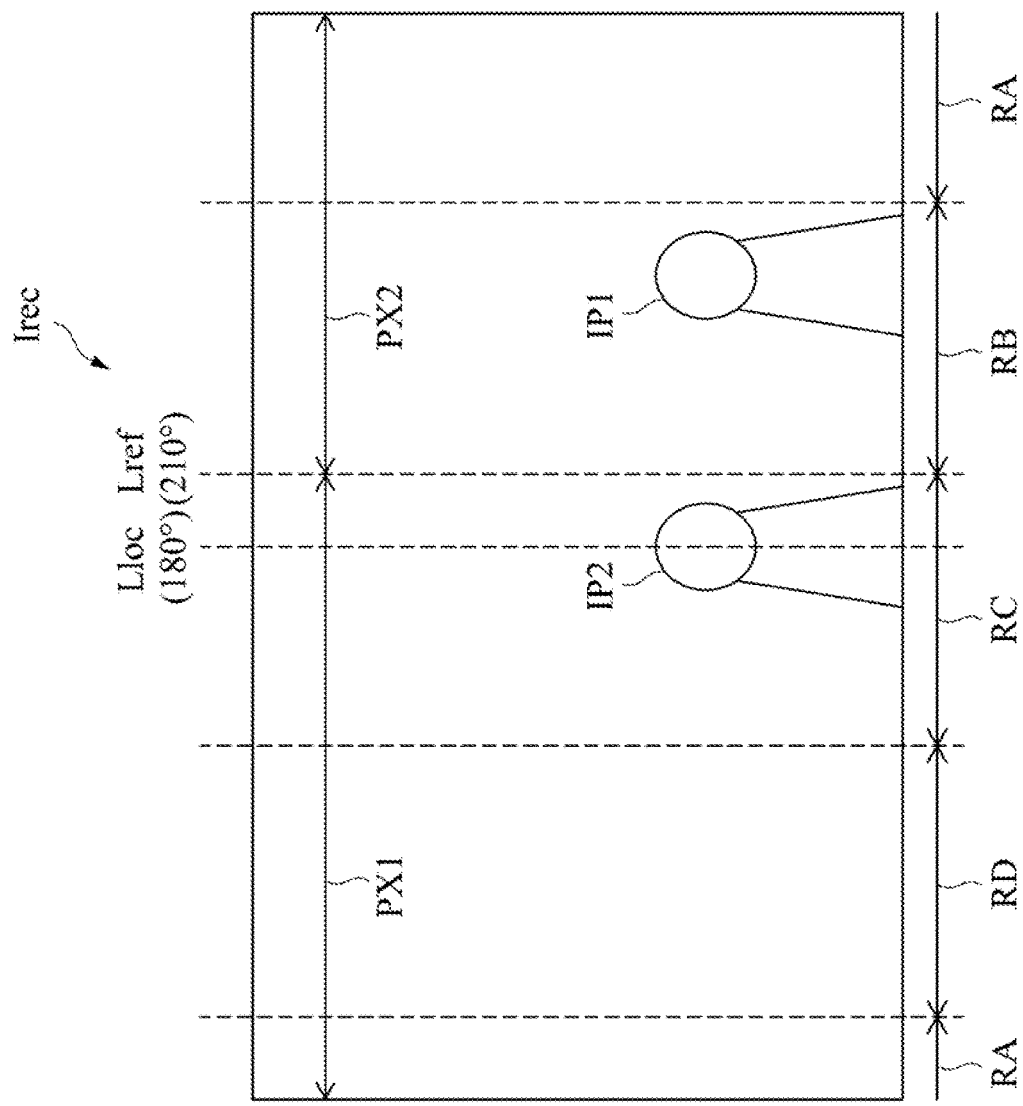
FIG. 12 is a schematic diagram of the rectangle image being adjusted in accordance with some embodiments of the present disclosure.

The adjustments of the rectangle image Irec would be described below with reference to FIGS. 11 and 12. FIG. 12 is a schematic diagram of the rectangle image Irec being adjusted in accordance with some embodiments of the present disclosure. Referring to FIG. 11 first, the control device 11 defines columns of pixels 180 degrees to the left of the position line Lloc and columns of pixels 30 degrees to the right of the position line Lloc as a first pixel area PX1, and defines columns of pixels 150 degrees to the right of the reference line Lref as a second pixel area PX2. Then, the control device 11 moves the first pixel area PX1 150 degrees to the left, and moves the second pixel area PX2 210 degrees to the right, so that the position line Lloc is corresponding to the 180-degree position as shown in FIG. 12. That is to say, the person image IP2 is positioned at the center of the rectangle image Irec being adjusted. It should be understood that the adjustment of the rectangle image Irec is not limited to the above descriptions. Any approaches capable of adjusting the object of interest (i.e., the person image IP2) to the center of the rectangle image Irec are included in the scope of the present disclosure.

In step S1003, the control device 11 of the video conference system 100 controls the display device 20 to display the rectangle image Irec being adjusted. In the condition that the person P2 stops speaking, the control device 11 outputs the rectangle image Irec being adjusted as shown in FIG. 12 to the display device 20, and controls the display device 20 to display the rectangle image Irec being adjusted. In such way, the person in the space can be aware or reminded by the display device 20 that the current speaker is the person P2, so as to ask or respond to the previous speech of the person P2. Thereafter, step S303 is executed again, so as to detect the direction of the at least one voice signal Svoi in the subsequent operations.

In the above embodiments, as shown in FIG. 5, the rectangle image Irec is a panoramic image, but the present disclosure is not limited herein. In some embodiments, the image processing circuit 115 of the control device 11 can further process the rectangle image Irec to generate a rectangle image in another form. For example, referring to FIGS. 13 and 14, FIG. 13 is a schematic diagram of a four split rectangle image Irec_4 in accordance with some embodiments of the present disclosure, and FIG. 14 is a schematic diagram of a two split rectangle image Irec_2 in accordance with some embodiments of the present disclosure.

Figure 13:
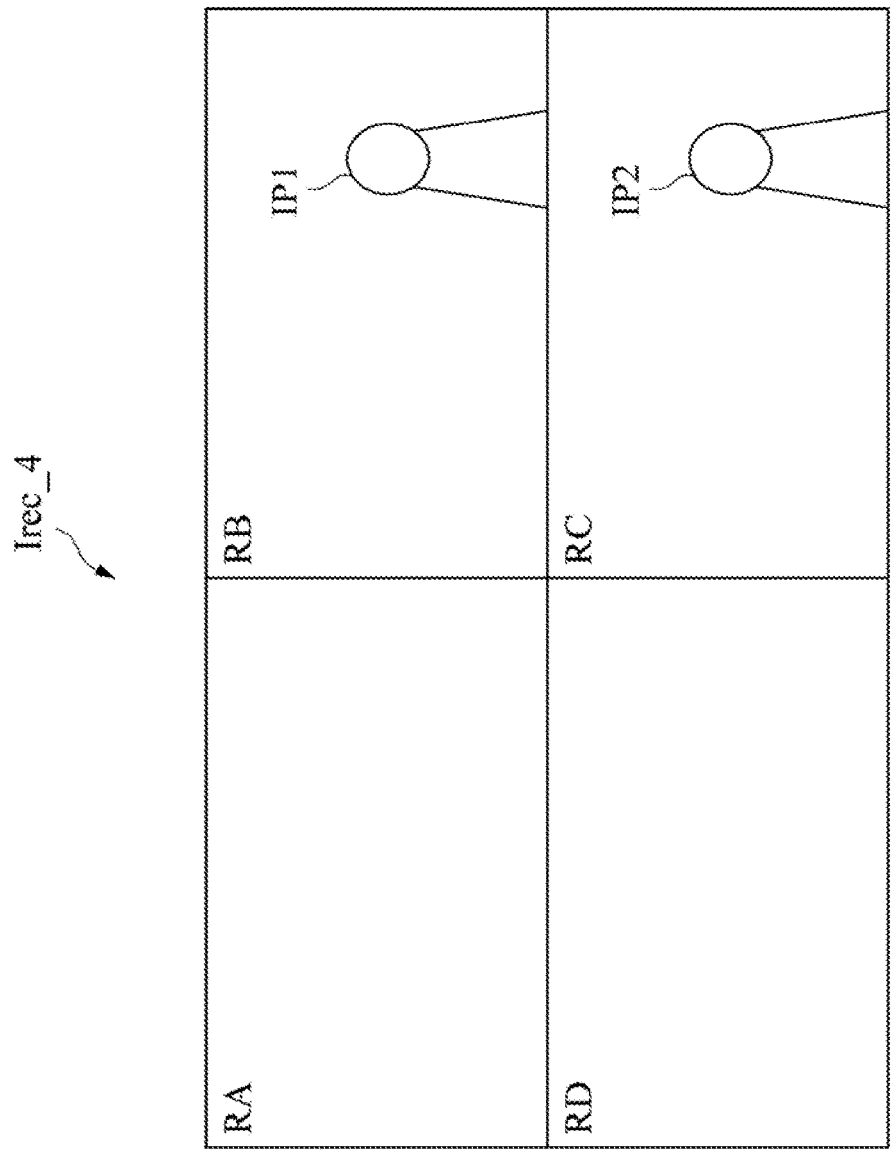
FIG. 13 is a schematic diagram of a four split rectangle image in accordance with some embodiments of the present disclosure.

In some embodiments, as shown in FIG. 13, the image processing circuit 115 divides the four image areas RA-RD in the rectangle image Irec, and rearranged the four image areas RA-RD being divided into an image array of 2 columns and 2 rows, to generate the four split rectangle image Irec_4. The control device 10 can replace the rectangle image Irec with the four split rectangle image Irec_4 to execute the above related steps.

Figure 14:
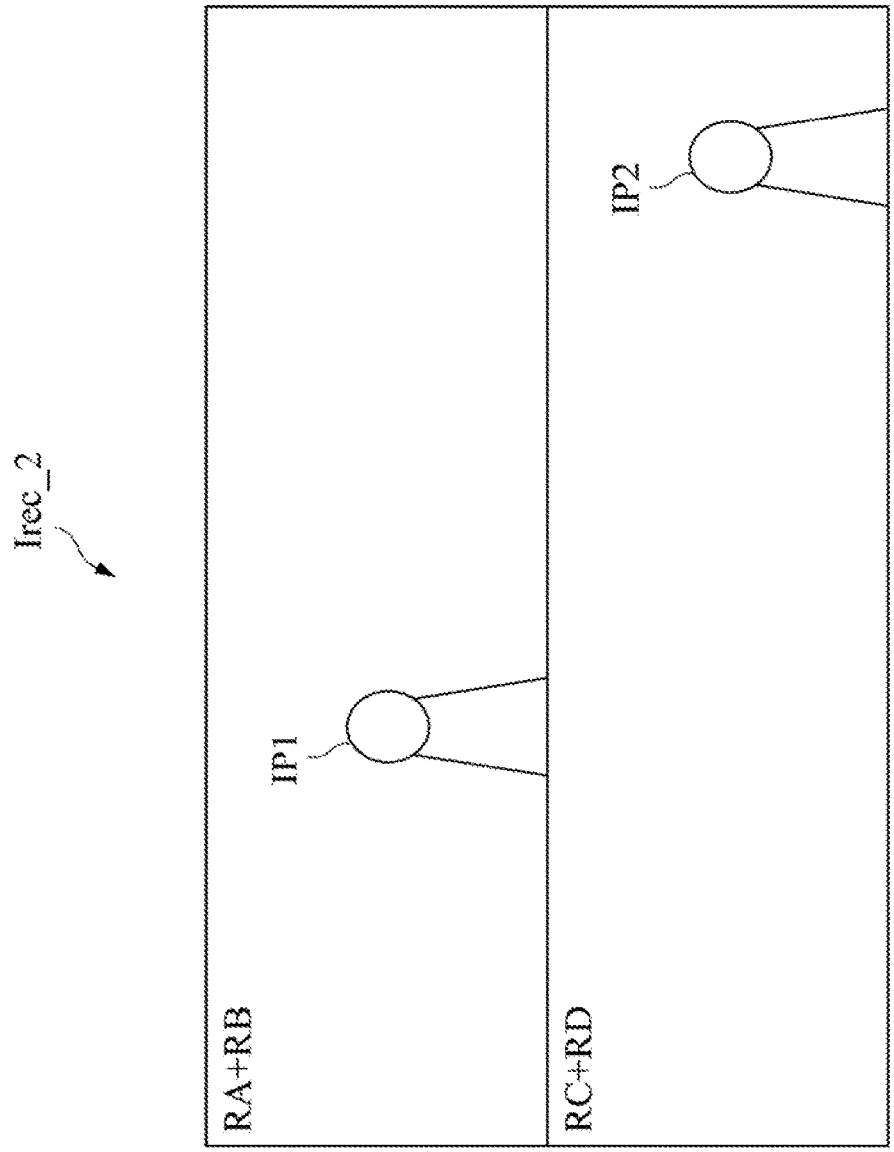
FIG. 14 is a schematic diagram of a two split rectangle image in accordance with some embodiments of the present disclosure.

In some embodiments, as shown in FIG. 14, the image processing circuit 115 divides the rectangle image Irec in half (for example, one includes the image areas RA-RB, and the other one includes the image areas RC-RD), and rearranged the two halves into an image array of 1 columns and 2 rows, to generate the two split rectangle image Irec_2. The control device 10 can replace the rectangle image Irec with the two split rectangle image Irec_2 to execute the above related steps.

As can be seen from the above embodiments of the present disclosure, the video conference system 100 and the conference frame display method 300 of the present disclosure tracks the speaker by detecting the direction of the voice signal Svoi and by recognizing the object of interest from the rectangle image Irec according to the direction of the voice signal Svoi. In such way, it is allowed to correctly focus on the frame area where the speaker is.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A video conference system, comprising:
   a control device, configured to:
   detect a direction of at least one voice signal according to at least one audio signal;
   perform an image recognition on at least one of a plurality of image areas in a rectangle image according to the direction of the at least one voice signal; and
   in a condition that at least one object of interest is recognized from the at least one of the plurality of image areas, control a display device to display an emphasized frame visually highlighting the at least one object of interest,
   wherein the control device is further configured to calculate a position information of the at least one object of interest, which comprises a person image, in the rectangle image, adjust the rectangle image according to the position information in a condition that the at least one voice signal is not detected from the image area where the at least one object of interest is, so that the person image is positioned at a center of the rectangle image, and control the display device to display the rectangle image being adjusted.

2. The video conference system of claim 1, further comprising:
a sound receiving component, configured to receive a sound in a space, to generate the at least one audio signal to the control device.

3. The video conference system of claim 2, wherein the control device is further configured to control the sound receiving component to receive the sound in the space in a condition that the at least one object of interest is not recognized from the at least one of the plurality of image areas, to execute the step of detecting the direction of the at least one voice signal and the step of performing the image recognition on the at least one of the plurality of image areas.

4. The video conference system of claim 2, wherein the control device is further configured to:
process the at least one audio signal generated by the sound receiving component, to obtain a feature value and a direction of the at least one audio signal; and
in a condition that the feature value of the at least one audio signal is greater than a threshold value, regard the direction of the at least one audio signal as the direction of the at least one voice signal.

5. The video conference system of claim 4, wherein the control device is further configured to control the sound receiving component to receive the sound in the space in a condition that the feature value of the at least one audio signal is smaller than or equal to the threshold value, to execute the step of detecting the direction of the at least one voice signal.

6. The video conference system of claim 1, further comprising:
a lens component, configured to capture a space, to generate a circular image of the space to the control device,
wherein the control device is further configured to process the circular image, to generate the rectangle image of the space.

7. The video conference system of claim 1, wherein the control device is further configured to highlight the image area where the at least one object of interest is, to generate the emphasized frame, wherein the control device is further configured to display the rectangle image in a condition that the at least one voice signal is not detected or the at least one object of interest is not recognized from the image area being highlighted.

8. The video conference system of claim 1, wherein the control device is further configured to highlight the image area where the at least one object of interest is, to generate the emphasized frame, wherein the control device is further configured to execute the step of displaying the emphasized frame in a condition that the at least one voice signal is detected or the at least one object of interest is recognized from the image area being highlighted.

9. A conference frame display method, comprising:
detecting a direction of at least one voice signal according to at least one audio signal;
performing an image recognition on at least one of a plurality of image areas in a rectangle image according to the direction of the at least one voice signal;
in a condition that at least one object of interest is recognized from the at least one of the plurality of image areas, by a display device, displaying an emphasized frame visually highlighting the at least one object of interest;
calculating a position information of the at least one object of interest, which comprises a person image, in the rectangle image;
in a condition that the at least one voice signal is not detected from the image area where the at least one object of interest is, adjusting the rectangle image according to the position information, so that the person image is positioned at a center of the rectangle image; and
by the display device, displaying the rectangle image being adjusted.

10. The conference frame display method of claim 9, further comprising:
by a sound receiving component, receiving a sound in a space, to generate the at least one audio signal.

11. The conference frame display method of claim 10, further comprising:
in a condition that the at least one object of interest is not recognized from the at least one of the plurality of image areas, executing the step of receiving the sound in the space.

12. The conference frame display method of claim 10, wherein the step of detecting the direction of the at least one voice signal comprises:
processing the at least one audio signal, to obtain a feature value and a direction of the at least one audio signal; and
in a condition that the feature value of the at least one audio signal is greater than a threshold value, regarding the direction of the at least one audio signal as the direction of the at least one voice signal.

13. The conference frame display method of claim 12, further comprising:
in a condition that the feature value of the at least one audio signal is smaller than or equal to the threshold value, executing the step of receiving the sound in the space.

14. The conference frame display method of claim 9, further comprising:
by a lens component, capturing a space, to generate a circular image of the space; and
processing the circular image, to generate the rectangle image of the space.

15. The conference frame display method of claim 9, further comprising:
highlighting the image area where the at least one object of interest is, to generate the emphasized frame; and
in a condition that the at least one voice signal is not detected or the at least one object of interest is not recognized from the image area being highlighted, by the display device, displaying the rectangle image.

16. The conference frame display method of claim 9, further comprising:
highlighting the image area where the at least one object of interest is, to generate the emphasized frame; and
in a condition that the at least one voice signal is detected or the at least one object of interest is recognized from the image area being highlighted, executing the step of displaying the emphasized frame.

* * * * *